(12) United States Patent
Petrey, III (10) Patent No.: US 8,353,341 B1
(45) Date of Patent: Jan. 15, 2013

(54) WELL SYSTEM

(76) Inventor: Paul A. Petrey, III, Tampa, FL (US)

( * ) Notice: Subject to any disclaimer, the term of this patent is extended or adjusted under 35 U.S.C. 154(b) by 423 days.

(21) Appl. No.: 12/655,568

(22) Filed: Jan. 4, 2010

(51) Int. Cl.
*E21B 43/00* (2006.01)

(52) U.S. Cl. ........ 166/266; 166/369; 166/378; 166/89.1

(58) Field of Classification Search .................. 166/379, 166/266, 369, 52, 89.1, 75.13, 127, 242.3
See application file for complete search history.

(56) References Cited

U.S. PATENT DOCUMENTS

| | | | |
|---|---|---|---|
| 4,536,257 A | 8/1985 | Atwell | |
| 5,370,182 A * | 12/1994 | Hickerson | 166/401 |
| 5,740,861 A * | 4/1998 | Williams | 166/66 |
| RE36,282 E | 8/1999 | Nitschke | |
| 7,051,807 B2 | 5/2006 | Vinegar et al. | |
| 7,241,383 B2 | 7/2007 | Katano | |
| 7,381,310 B2 | 6/2008 | Hernandez Hernandez et al. | |
| 7,540,339 B2 | 6/2009 | Kollé | |
| 2008/0169098 A1 | 7/2008 | Christopher et al. | |
| 2009/0308616 A1 * | 12/2009 | Wylie et al. | 166/380 |

FOREIGN PATENT DOCUMENTS

WO    WO/03/102346    11/2003

* cited by examiner

*Primary Examiner* — Daniel P Stephenson
*Assistant Examiner* — Yong-Suk (Philip) Ro
(74) *Attorney, Agent, or Firm* — Edward P Dutkiewicz (57) ABSTRACT

A well system comprising, in combination, a recipient ground area, a surface casing, a source well casing, a return well casing, and a return pipe. The return pipe is located within the return well casing, and the return well casing is located within the source well casing. This arrangement allows the removal of water from, and the return of water to different strata through the same drilled well hole, while also monitoring different aquifers water quality and/or aquifer parameters.

4 Claims, 3 Drawing Sheets

WELL SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND OF THE INVENTION

Rule 1.78(F) (1) Disclosure

The Applicant has not submitted a related pending or patented non-provisional application within two months of the filing date of this present application. The invention is made by a single inventor, so there are no other inventors to be disclosed. This application is not under assignment to any other person or entity at this time.

1. Field of the Invention

The present invention relates to a well system and more particularly pertains to a novel way of configuring a well to minimize cost and environmental impact.

DESCRIPTION OF THE PRIOR ART

The use of other configurations of wells is known in the prior art. More specifically, commonly used well configurations previously devised and utilized for the purpose of obtaining water, and other well configurations for the disposing of waste water from permeate processes are known to consist basically of familiar, expected, and obvious structural configurations, notwithstanding the myriad of designs encompassed by the crowded prior art which has been developed for the fulfillment of countless objectives and requirements.

While the prior art devices fulfill their respective, particular objectives and requirements, the prior art do not describe a well system that allows a novel way of configuring a well to combine providing a brackish water supply and concentrated brine disposal to minimize cost and reduce the environmental impact.

In this respect, the well system according to the present invention substantially departs from the conventional concepts and designs of the prior art, and in doing so provide an apparatus primarily developed for the purpose of a configuring a well for multi purpose use, minimizing well construction cost and reducing the environmental impact.

Therefore, it can be appreciated that there exists a continuing need for a new and improved well system which can be used for multiple purposes, while minimizing cost and environmental impact. In this regard, the present invention substantially fulfills this need.

2. Description of Related Art Including Information Disclosed Under 37 C.F.R. 1.97 and 1.98

A Separate IDS has been filed with this application.

BRIEF SUMMARY OF THE INVENTION

With the growing demands for fresh water and the limited available fresh water aquifers, municipalities and commercial water providers have been driven to develop fresh water supplies from brackish groundwater sources utilizing membrane filtration technology. The concentrated salt by product is disposed of in deep injection wells. These injections wells are required to have accompanying monitoring wells to monitor any potential upward migration.

The new well design provides a unique system for both a brackish water supply production and "down-hole" concentrated brine injection. The system herein described also allows for continuous monitoring of any of a number of parameters, such as water constituents, chemical composition changes, pressures, and temperature. Additionally, the use of multiple casings strings allows for monitoring of all the different aquifers, between the deepest return aquifer and the surficial aquifer system.

As such, the general purpose of the present invention, which will be described subsequently in greater detail, is to provide a new and improved well system configuring a well for multi purposes, minimizing construction cost and reducing the environmental impact.

To attain this, the present invention essentially comprises of a well system comprising several components, in combination.

First provided is a well site location. The well site location has an underlying deep strata with a receptive deep aquifer, a source strata with a brackish water source aquifer, and also has a surface strata and a surficial aquifer. The deep aquifer strata being deeper than the source strata, with the source strata being deeper than the surface strata.

The surface casing is first string installed to prevent surface hole collapse, and is generally installed to protect the surficial aquifer which it penetrates. A surface casing is fabricated of a rigid material. The surface casing has a minimal length, the largest diameter of the well system, and a lower end which is open. The surface casing has a generally round tubular configuration with an inner surface and an outer surface, and a wall thickness there between. The inner surface forms an interior passageway through the length of the surface casing. The surface casing is installed below the surficial aquifer system The surface casing has an associated surface casing end cap for sealing off the upper end of the surface casing once the source well casing has been installed within. The surface casing end cap has a generally centrally located around the source well casing. The surface casing end cap or plate can have access for at least one sensor aperture there through. This aperture can have at least one associated sensor for monitoring water quality and/or aquifer parameters.

The source well casing is used to isolate all the formations above the water production zone, or source aquifer.

A source well casing is fabricated of a rigid material. The source well casing has a length longer that the surface casing, with a small diameter and generally has a round tubular configuration, with an inner surface and an outer surface and a wall thickness there between. The inner surface forms an interior passageway through the length of the source well casing. The lower, open end of the source well casing is located to the top of the source well strata.

The source well casing is typically cemented to the surface, but the source well casing may also be cemented from the top of the source well strata up to the base of an existing shallower aquifer, which would allow for monitoring of the surficial aquifer parameters.

The source well casing has an associated source well casing end cap or plate for closing off the upper end of the source well casing once the return well casing has been installed. The end cap or plate has a generally centrally located and has access for at least one sensor aperture and at least one associated sensor coupled to it for monitoring water quality and/or aquifer parameters.

The source well casing has an associated source well output pipe, coupled to the source well casing. The source well output pipe provides the brackish water source to the membrane treatment system When brackish water is treated with membrane technology, one of the byproducts is a concentrated brine solution. This occurs when potable water is removed from the system via the membranes. One common method for disposing of this concentrated brine solution byproduct is by way of deep well injection. The injection zone is typically below, or deeper than, the brackish water supply below the "United Sates Drinking Water" USDW, and is required by regulations to have the final return well casing design of either a "tubing and packer" or "dual cased". This insures that the return well casing and return well pipe is either sealed off via the annular space between tubing and the liners being filled with a fluid under pressure to help detects any future leaks, or completely cemented within each other. The deep return aquifer also requires that the injected brine be injected under pressure to overcome the natural formation pressure. Injection pressure for brine disposal could be provided by the water treatment system. In some geologic conditions, like ones which occur in the Florida Keys, the injection zone is located above the brackish water supply, reversing this well design. The herein well design allows for the isolation of the deep and superficial aquifers, whether they be source and return, or return and source, respectively.

A return well casing is fabricated of a rigid material. The return well casing has a length which is longer that the source well casing and of smaller diameter. The return well casing has a generally round tubular configuration with an inner surface and an outer surface with a wall thickness there between. The inner surface forms an interior passageway through the length of the return well casing. The lower, open end of the return well casing is located to the top of the return well strata.

The return well casing has an associated return well end cap or plate for closing the upper end of the return well casing once an internal return pipe has been installed. The return well casing end cap or plate has access for at least one sensor aperture and at least one associated sensor coupled thereto for monitoring water quality and/or return aquifer parameters.

The return well casing is located within the interior passageway of the source well casing, and is cemented in place up to the base of the source water aquifer.

A return pipe is fabricated of a rigid material. The return pipe has a length, with a first upper end and a second lower end. The first upper end of the return pipe has a curved portion. The return pipe having a generally round tubular configuration, with an inner surface and an outer surface with a wall thickness there between. The inner surface forms an interior passageway through the length of the return pipe. The return pipe is located within the interior passageway of the return well casing. The lower end of the return pipe is located to the top of the return well strata aquifer. The return pipe is held in place either by a downhole packer for joining the return pipe to the return well casing, or cemented in place. The return pipe has at least one associated sensor for monitoring water quality and/or aquifer parameters.

A water treatment system is operatively connected to the well system. The water treatment system also has a source water inflow pipe. The water treatment source water inflow pipe is coupled to the source well output pipe.

There is a water treatment system pressure booster pump. The booster pump is operatively coupled to the water treatment system inflow pipe. The booster pump has an associated control. The booster pump is operatively coupled to the control. The booster pump has an output.

There is a plurality of inline filters. The inline filters are coupled to the booster pump. The inline filters function by filtering the output of the booster pump. The inline filters have an associated inflow pipe. The inline filters have an output manifold. The inline filters have an output; the inline filters output being the output of the booster pump.

A water treatment system has a membrane water treatment system. The membrane water treatment system has an inflow pipe. The membrane water treatment system's inflow pipe is operatively coupled to the inline filter manifold. The membrane water treatment system has two outflow pipes, one pipe for the membraned filtered product "permeate", and one pipe for the concentrated salt byproduct "brine". The membrane inflow pipe takes the inline filters output. The membrane treatment system permeate outflow pipe is operatively coupled to a municipal water distribution system.

The membrane water treatment system has a bypass pipe. The bypass pipe operatively provides a percentage of the inline filters manifold source water to the outflow pipe of the water treatment membrane. This allows a percentage of source water to bypass the membrane water treatment system. This allows a percentage of the source water properties to be commingled with the treated water providing the optimum water quality parameters.

There is a chlorination system operatively coupled to the bypass pipe and to the membrane water treatment system outflow pipe. The chlorinators system has sensors and associated controls. The controls are operatively coupled to each of the water chlorinators to provide the required water disinfection prior to distribution. Other types of water disinfectant options could be substituted for the chlorinators, such as ultraviolet (UV) light sources.

The membrane water treatment system has a brine return pipe. The brine return pipe operatively couples the membrane water treatment system with the return pipe at the wellhead. The brine is then injected into the return strata utilizing the membrane treatment system's pressure.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved well system which has all of the advantages of the prior art commonly used well configurations and none of the disadvantages.

It is another object of the present invention to provide a new and improved well system which may be easily and efficiently constructed and marketed.

It is further object of the present invention to provide a new and improved well system which is of durable and reliable construction.

An even further object of the present invention is to provide a new and improved well system which is susceptible of a low cost of construction with regard to both materials and labor, and which accordingly is then susceptible of low prices of sale to the consuming public, thereby making such well system economically available to the buying public.

Even still another object of the present invention is to provide a novel well system configured to minimize cost and environmental impact.

Lastly, it is an object of the present invention to provide a new and improved well system comprising, in combination a well site, a surface casing, a source well casing, a return well casing, and a return pipe. The return pipe is located within the return well casing, and the return well casing is located within the source well casing. This arrangement allows the removal of water from, and the return of water into, different strata through the same drilled well. Coupling this Well System to a remote membrane water treatment system, provides a remote source of treated water where ever it is needed.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DESCRIPTION OF THE DRAWINGS

The invention will be better understood and objects other than those set forth above will become apparent when consideration is given to the following detailed description thereof. Such description makes reference to the annexed drawings wherein:

FIG. 1 is an overhead view of the well system coupled to a water processing system, such as a reverse osmosis, or membrane water treatment system. FIG. 1 demonstrates the relationship of the well head and well structure with a water treatment system.

The same reference numerals refer to the same parts throughout the various Figures.

DETAILED DESCRIPTION OF THE PREFERRED EMBODIMENT

Figure 1:
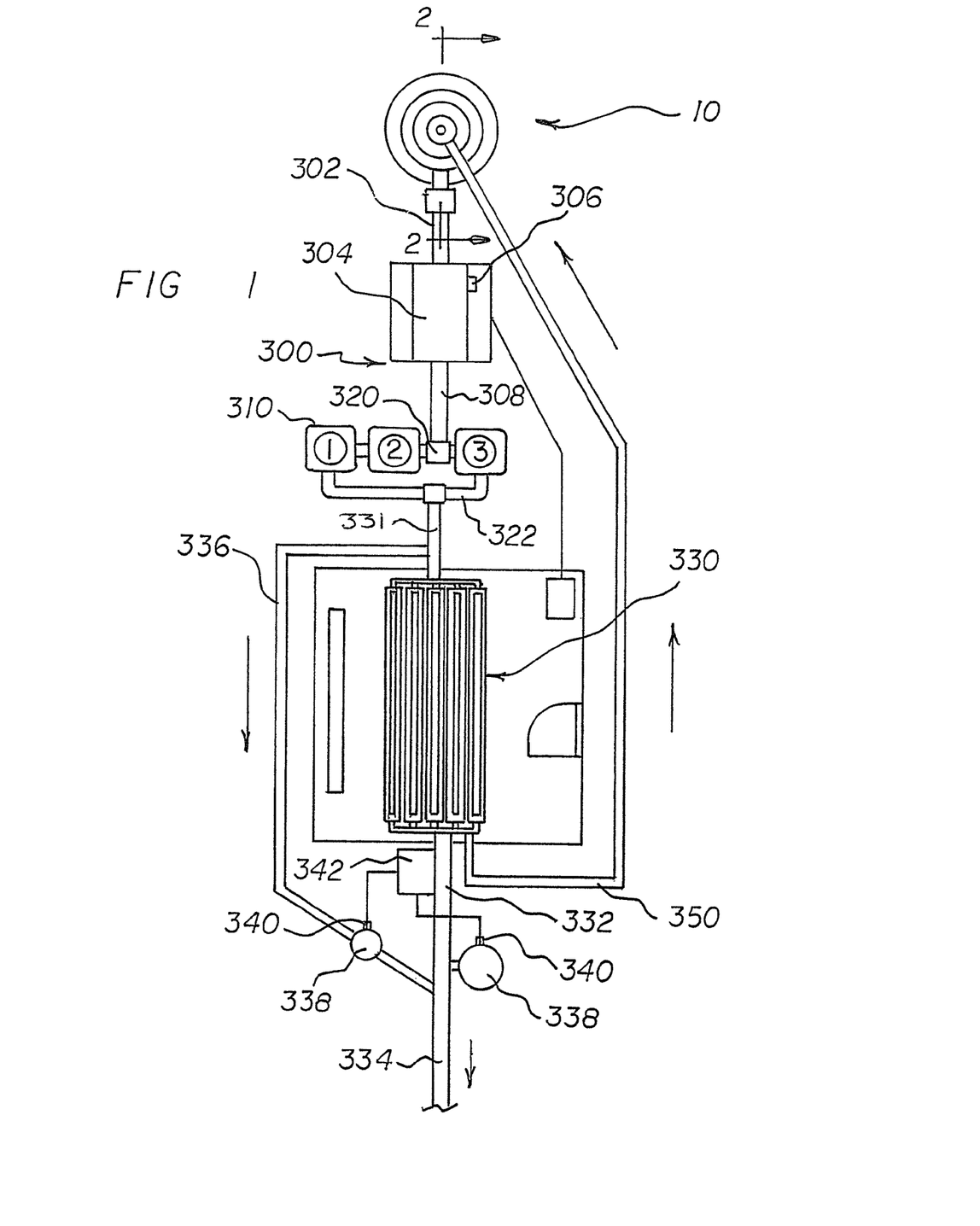

With reference now to the drawings, and in particular to FIG. 1 thereof, the preferred embodiment of the new and improved well system embodying the principles and concepts of the present invention and generally designated by the reference numeral 10 will be described.

The present invention, the well system 10 is comprised of a plurality of components. Such components in their broadest context include a surface casing, a source well casing, a return well casing and a return pipe. Such components are individually configured and correlated with respect to each other so as to attain the desired objective.

A well system is described, with the well system comprising several components, in combination.

Figure 2:
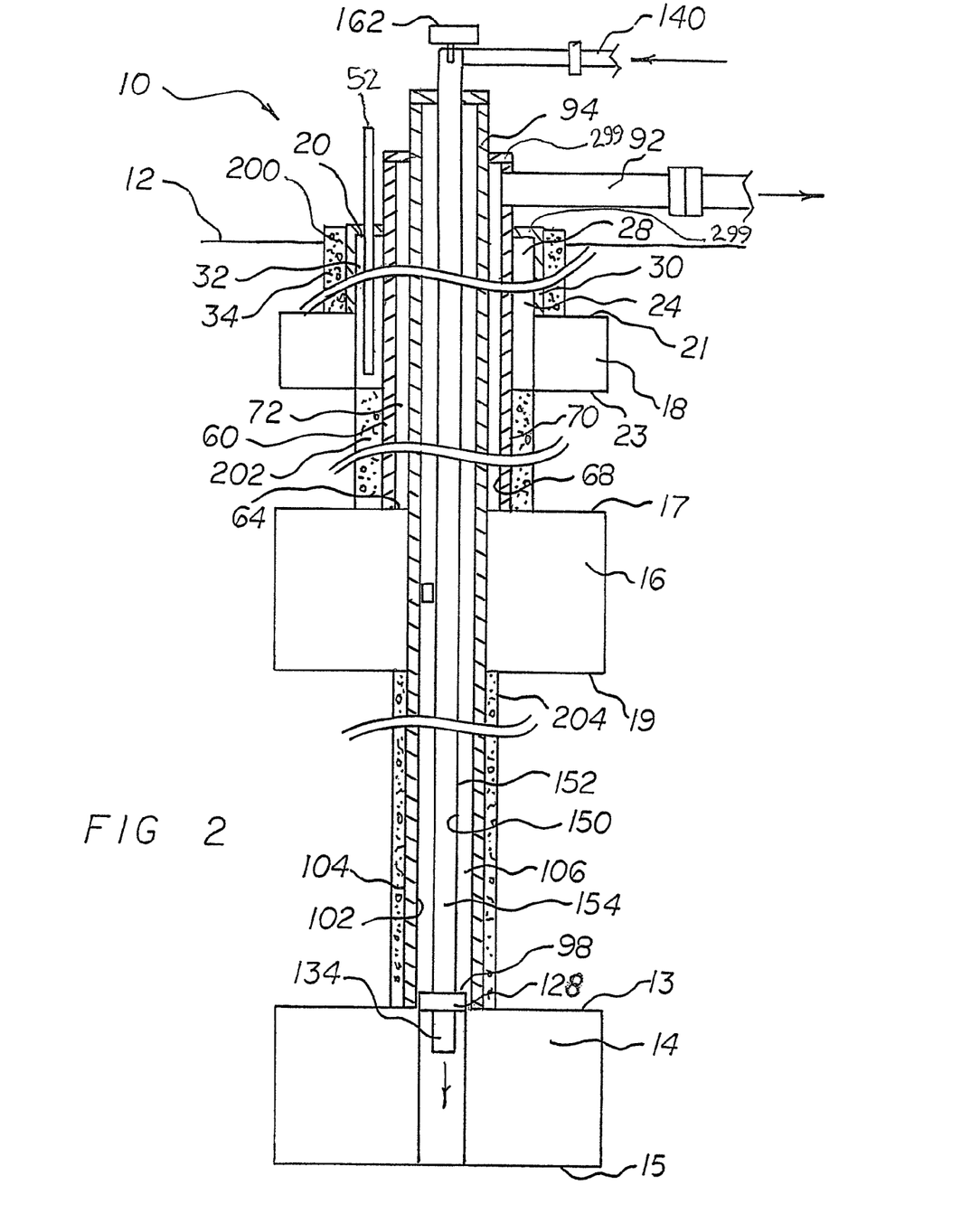
FIG. 2 is a cross sectional side view of the well system, showing three strata along with three casings. Note the sensor positioned between the surface well casing inner surface and the outer surface of the source well casing. These sensors may be any type for monitoring the well's function and/or various water quality parameters.

First provided is a recipient ground area 12. The recipient ground area or well site has an underlying deep strata with a deep aquifer 14, and a source strata with a source aquifer 16. The ground area has a surface strata 18. The deep strata and deep aquifer has an upper extent 13 and a lower extent 15. The source strata and source aquifer has an upper extent 17 and a lower extent 19. A surface strata and a surficial aquifer has an upper extent 21 and a lower extent 23.

The deep aquifer strata being deeper than the source strata, with the source strata being deeper than the surface strata. These Geological formations, which may make up various surface strata, may vary in configuration and relation to each other. Such variations are commonly known to exist and distortions may occur through surface movement.

The basic system, herein described, is a well system which uses a single well hole to remove water from the well through the source well casing, and then to return water to another strata aquifer through the return pipe located within the return well casing.

Water systems, or aquifers, may exist at various depths in the earth's surface. Generally the deep water source is brackish, a mixture of salts and water. The advantage of such a brackish water aquifer for membrane treatment, as opposed to sea water source, or a surface reservoir source, is that the aquifer, that is, the groundwater source, has reduced dissolved oxygen, and hence, bacterial growth is minimal. Deep groundwater also lacks debris which is common in surface water sources because it is neutrality filtered by the geologic formation it is contained within. Moreover, groundwater has is a constant temperature, which is of paramount importance when using a membrane system technology for water treatment.

The common practice in accessing to a brackish groundwater source is to drill a first well for removing the water, that is, a production well. And then a second, deeper well is then drilled to as a disposal well for the injection of the bi-product produced from the membrane filtration process, which is the concentrated brine, back into the earth's sub-surface layer. The injection well is legislatively required to have two associated monitor wells constructed to monitor both the injection zone and the zone just above the injection zone. Such a injection well system poses a greater financial burden caused by the extra drilling that is required. Such injection systems also require more land, that is, to the drill the injection well and associated monitor wells, the additional land use being an ecological disadvantage.

The present system allows for a single well to be constructed, at far less cost, and less required land or "foot print". The single well system is herein described.

A surface casing 20 is fabricated of a rigid material. The surface casing has a length, which is capped on the upper end once the next string of casing has been installed and a second lower end which is open 24. The surface casing has a generally round tubular configuration with an inner surface 28 and an outer surface 30, and a wall thickness there between. The inner surface forms an interior passageway 32 through the length of the surface casing. The surface casing may be steel, plastic, or a composite material. Generally, the surface casing extends from the surface of the ground to the entry point of the underlying bedrock and isolates any surficial aquifers that may be present. The length of the surface casing varies, depending on the depth of soils overlying the bedrock. In areas were the bedrock lies close to, or at, the ground surface, a surface casing may be eliminated. The surface casing is permanently installed and protected by a concreted encasement 34. The surface casing has a first external diameter and a first internal diameter. The first external diameter is greater than the first internal diameter.

Figure 3:
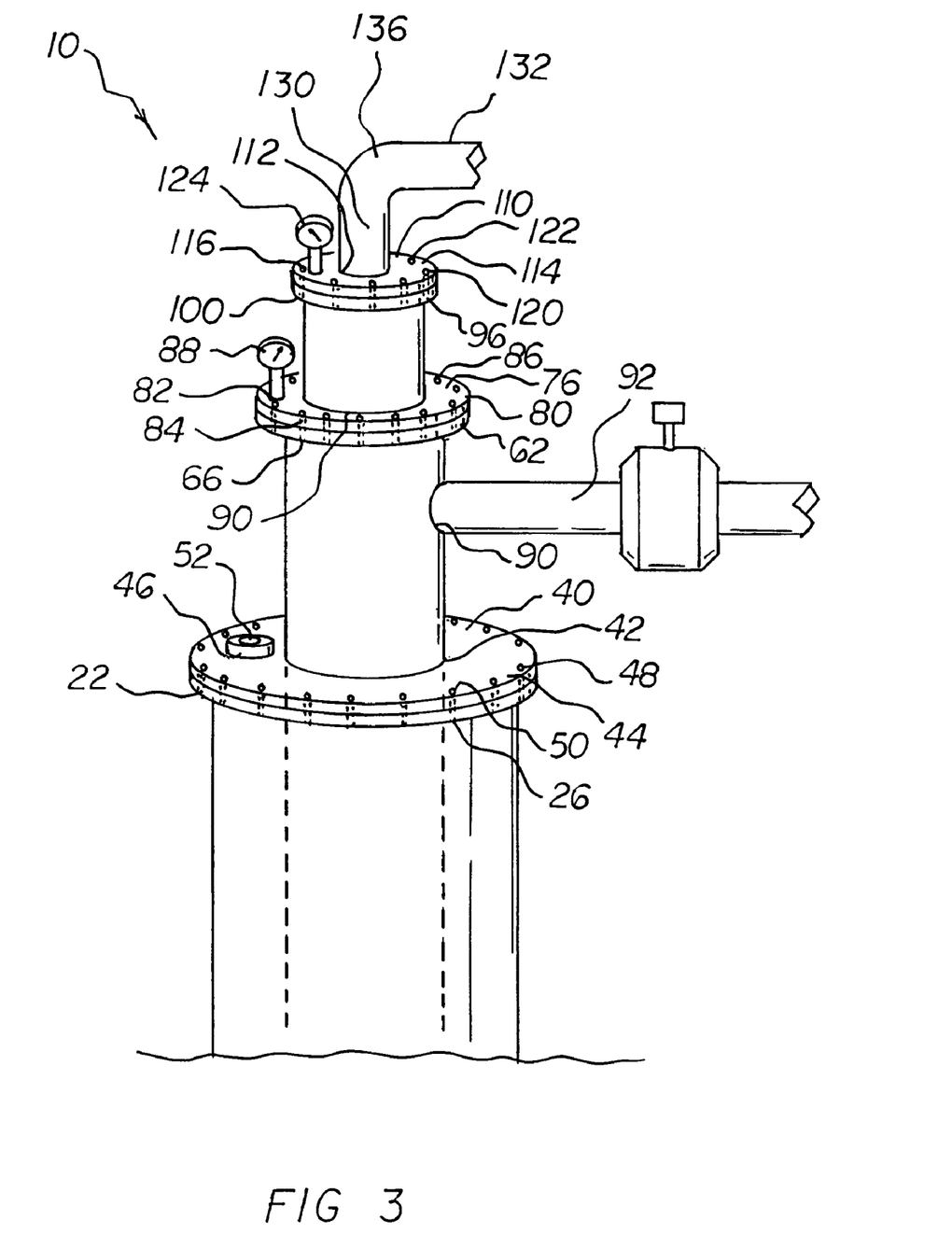
FIG. 3 is a perspective view of the well system located above the ground. Again note the sensor access between each of the casing strings. The end cap seals the area between each casing string.

The surface casing is located within the surface strata of the well site. The surface casing has an associated surface casing end cap or plate 40 for closing the upper end of the surface casing once the next string of casing has been installed. The surface casing end cap or plate is generally centered around a source well casing and has at least one sensor aperture port 46 there through. The aperture port has at least one associated water quality or aquifer parameter sensor 52 coupled there to.

The source well casing 60 is fabricated of a rigid material. The source well casing may be fabricated of steel, plastic, or a composite material. The source well casing has a length and an open second lower end 64 The source well casing has a generally round tubular configuration, with an inner surface 68 and an outer surface 70 and a wall thickness there between. The inner surface forms an interior passageway 72 through the length of the source well casing. The lower, open end of the source well casing is located within the source well strata and is cemented in place up to the base of the Surficial aquifer if it is to be monitored or all the way up to the surface if the surficial aquifer is not going to be monitored.

The location of the source well casing allows water to be pumped up to the surface through the source well casing. In situations where the ground well source is under sufficient pressure, such as in an artisan well, the groundwater may free flow to the top of the source well casing. If the source groundwater does not flow to surface under it's own pressure a submersible pump, or centrifugal pump (not shown, but well known in the art) may be placed within the source well casing to pump the source ground well to surface. The source well casing has an associated source well casing end cap or plate for closing the upper end of the source well casing at surface. The end cap or plate is generally centrally located around the internal return well casing aperture 76. The source well casing end cap or plate has access to for at least one sensor aperture port 82 there through. The aperture port has at least one associated sensor 88 coupled there to. The sensor may be a pressure sensor, or a chemical sensor, so as to monitor the source water quality or characteristics on a moment to moment basis. In other embodiments, any numbers of sensors are anticipated in variations of the configuration.

The source well casing has a source well output pipe aperture port 90, and an associated source well output pipe 92 which is coupled to the source well casing. If a pump is required to move the source groundwater to surface, the pump output pipe would be the well output pipe. The source well casing is located within the interior passageway of the surface casing.

A return well casing 94 is fabricated of a rigid material. The return well casing may be fabricated of steel, plastic, or a composite material. The return well casing has a length with an open second lower end 98. The return well casing has a generally round tubular configuration with an inner surface 102 and an outer surface 104 with a wall thickness there between. The inner surface forms an interior passageway 106 through the length of the return well casing. The lower, open end of the return well casing is located within the return well strata and is cemented in place up to the base of the source water strata.

The return well casing has an associated return well end cap or plate 110 for closing the upper end of the return well casing once the return piping is installed. The return well casing end cap or plate has a generally centrally located return pipe aperture 112. The return well casing end cap or plate has at least one sensor aperture 116 there through. The return well casing end cap mates with the upper end of the return well casing. The return well casing has at least one associated sensor 124 coupled there to. The return well casing is located within the interior passageway of the source well casing.

The sensor attached to the return well casing may be a pressure sensor, though any number and types of sensors may be used. In other embodiments, a chemical sensor may be used to constantly monitor returned water characteristics and solute concentration.

The distance between the source well aquifer and the return well aquifer varies with geological formations. In the preferred embodiment the distance between the source well aquifer and the return well aquifer is sufficient to provide complete isolation between them. A return pipe 130 is fabricated of a rigid material. The return pipe may be fabricated of steel, plastic, or a composite material. The return pipe has a length, with a first upper end 132 and an open second, lower end 134. The first upper end of the return pipe has a curved portion 136. In other embodiments the return pipe may be operatively coupled to a water treatment system return pipe 140.

The return pipe has a generally round tubular configuration, with an inner surface 150 and an outer surface 152 with a wall thickness there between. The inner surface forms an interior passageway 154 through the length of the return pipe. The return pipe is located within the interior passageway of the return well casing. The lower end of the return pipe is located within the return well strata aquifer. The return pipe has an associated external downhole packer 128 located at the lower end of the return pipe. The external packer is configured to mate with and seal the outer surface of the return pipe and the inner surface of the return well casing. The external packer seals the interior of the return pipe to the return aquifer, and does not allow the passage of any return injected water into the return well casing. The space between the return well casing and the return pipe has at least one associated sensor 124 coupled there to. The sensors located between the return well casing and the return pipe continuously monitor and instantly detect water intrusion into the space within the return well casing. The return pipe has at least one associated sensor 162 for monitoring water quality and/or aquifer parameters.

The well is configured to have a stepped openhole configuration. Each part of the drilled borehole is sized larger than the casing which will be located within that part of the well borehole. For example, the surface casing wellbore is larger than the surface casing. This allows the injecting of cement 200 around the casing, to form a tight seal around the casing and between the lower end exterior of the casing and the surface. The source well casing's borehole is, likewise, larger than the source well casing diameter. The source casing is installed, from the top of the source aquifer to surface. The associated borehole area is injected with cement 202 to near the surface within the surface casing if the surficial aquifer is going to be monitored or all the way to surface if it is not.

In a same manner, the return well casing borehole section is larger than the return well casing. Then the return well casing is installed, and the borehole section around the casing is injected with cement 204, from the top of the return well aquifer to the base of the source well aquifer. This cement encasement of the return well casing seals the return aquifer from the source aquifer. The insertion of the end plug, around the lower end of the return pipe completes the isolation of each of the strata, and aquifers, from the other, or the surface. The tight seal allows the return water to be pumped down, under pressure, if necessary, to force the returned water into the deepest aquifer.

The well system 300 may be used in conjunction with a water treatment system. In the preferred embodiment the water treatment system is operatively connected to the well system. The term "water treatment system", may be any one of the commonly used water treatment systems, such as membrane filtration treatment systems, commonly employed for the treating brackish water sources.

The water treatment system has water treatment inflow pipe 302. The water treatment inflow pipe is coupled to the source well output pipe.

There is a water treatment system pressure booster pump 304. The booster pump is operatively coupled to the water treatment system inflow pipe. The booster pump has associated controls 306. The booster pump is operatively coupled to the controls. The booster pump has an output pipe 308 and an output flow.

Generally the source water from a well either free flows or is pumped out the well output pipe. The source water's natural or induced pumping pressure may not, however be adequate to run the water treatment system. A booster pump is then used to augment the well pump, so as to deliver pressurized water to the remainder of the water treatment system. In systems where water pressure is adequate to run the treatment system, the booster pump may be omitted.

The water treatment system employs a plurality of inline filters 310. The inline filters are coupled either in parallel or in series to the booster pump, depending on the application required. FIG. 1 shows both a parallel filter and series filters. Filter 1 and 2 are in series, and Filters 2 and 3 are in parallel. In the preferred embodiment, the inline filters are placed in series. The inline filters function is to filter the output of the booster pump. The inline filters have an associated inflow pipe. The inline filter inflow pipe 320 is coupled to the booster pump. The inline filters have an output manifold 322. The inline filters have an output flow, the inline filter output being the output of the booster pump so that when the system is at equilibrium the filter input volume is equal to filter output volume.

A membrane water treatment system has a treatment membranes 330. The membranes have an inflow pipe. The membranes inflow pipe 331 is operatively coupled to the inline filter manifold. The membrane has an outflow pipe 332. The membrane outflow pipe is operatively coupled to a municipal water distribution system 334.

The membrane water treatment system has a bypass pipe 336. The bypass pipe operatively couples the inline filter's manifold and the outflow pipe to the water treatment membrane outflow pipe. This allows a percentage of filtered source water to bypass the membrane treatment system and thereby increasing hardness, as well as other physical chemical characteristics. This blending provides certain water quality properties to be commingled with the treated water to produce the desired "finish water", which is then directed into the potable water supply for the municipality being served by the water treatment system.

There are treated water chlorinators 338 operatively coupled to the bypass pipe and to the membrane outflow pipe. The water chlorinators each have a sensor 340 and an associated control 342. The control is operatively coupled to each of the water chlorinators. The chlorinators operatively disinfect the treated and blended water prior to distribution. Other means of disinfection options can be substituted. Such other means are well known in the art.

The membrane water treatment system has a byproduct waste water return pipe 350. The byproduct waste water return pipe operatively couples the water treatment membrane with the return pipe at the wellhead 140. As the permeate (membrane treated water) is removed from the membrane (making that water potable, pure H2O), the remaining bi-product water then carries an increased amount of concentrate salts. The higher concentrated solute water (waste water: brine) is then returned to the well head, and injected down to the return well aquifer utilizing the membrane process pressure. If there is not sufficient process pressure remaining after the treatment process then additional injection pump can be added to the system.

The above described well design which allows a single well to perform the multiple tasks of providing a brackish water supply, brine disposal, and multiple aquifer monitoring, thereby greatly reducing the number of wells and the associated well construction cost, while reducing the amount of land required, the amount of surface piping required, and the associated energy requirements.

A remote water treatment plant can also provide a finished water supply where the water demand is need, using a deep well to provide a brackish groundwater supply and brine disposal well, while occupying a small surface area, or "footprint". A remote water treatment plant eliminates the need for constructing a new pipeline or enlarging existing pipelines to transport finished water from one central water treatment location to where it is needed.

The membrane treatment system herein described uses a single booster pump process pressure not only treat the source water with the membrane technology but also blend the treated water with a percentage of raw well water while also providing the required disposal pressure for injecting the byproduct "brine". Additionally, the system pressure may also be used to pressurize the potable water delivery system.

Method of Construction

The method of using the novel well design described herein is by first drilling a surface bore hole of a first internal diameter, with the diameter of the surface bore hole being larger than the external diameter of a surface casing. The surface casing has an external diameter and an internal diameter. The surface casing is inserted into the bore hole and cemented in place.

The bore hole is then again drilled downward, through the surface casing interior, until the source well water depth is reached. The source well aquifer and strata has an upper extent and a lower extent. The source well casing, having an internal diameter and an external diameter, is then inserted in the bore hole, through the surface casing. The source well external diameter is less than the internal diameter of the surface casing. The source well casing is cemented in place with the concrete running from the source well aquifer to the level just below the surface casing. This cementing just below the surface casing will accommodate monitoring any surficial ground water source which may be present.

The bore hole is then again drilled downward, extended to the deep return well strata and aquifer. The deep return well strata and aquifer has an upper extent and a lower extent. A return casing, having an internal diameter and an external diameter is then inserted into the bore hole, through the source well casing. The external diameter of the return well casing is less than the internal diameter of the source well casing. The return well casing is cemented in place with the cement being placed from the top of the deep return well aquifer to near the bottom of the lower extent of the source well strata.

A return pipe, having an external diameter and an internal diameter, is then inserted within the interior of the return well casing. The external diameter of the return pipe is less than the internal diameter of the return well casing. An end plug (packer) is inserted on the return pipe and installed into position within the return casing, at the level of the upper extent of the return well aquifer and strata, sealing the return pipe from the upper extent of the return well to above the ground.

The end caps or plates are placed around each of the casings, and aperture port(s) installed. A source well pump is inserted, if required, and the source well sealed with the end cap or plate with aperture port(s) and sensors are then attached. The return pipe is coupled to the return line of the membrane system, and the source well output pipe is coupled to the inflow pipe of the water treatment system.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

SEQUENCE LISTING

Not Applicable.

What is claimed as being new and desired to be protected by Letters Patent of the United States is as follows:

1. A well system comprising, in combination:
   a site location, the site location having at least one strata, the site location having a plurality of strata being an underlying deep strata with a deep aquifer, and a source strata with a source aquifer and a surface strata, with the deep strata being deeper than the source strata with the source strata being deeper than the surface strata;
   a surface casing having a tubular configuration with an interior passageway there through, the surface casing having a length with a first upper end and a second lower end, the surface casing having a generally round tubular configuration with an inner surface and an outer surface with a wall thickness there between, the inner surface forming the interior passageway through the length of the surface casing, the surface casing being located within the surface strata of the site location, the surface casing having an associated surface casing end cap for closing the upper end of the surface casing, the surface casing end cap having a generally centrally located source well casing aperture there through, the surface casing cap being configured to receive and mate with the upper end of the surface casing, the surface casing being fabricated of a rigid material, the surface casing end cap having at least one sensor aperture there through, the surface casing end cap having at least one associated sensor coupled thereto;
   a source well casing being located within the interior passageway of the surface casing, the source well casing having a tubular configuration with an interior passageway there through, the source well casing having a length with a first upper end and a second lower end, the source well casing having a generally round tubular configuration with an inner surface and an outer surface with a wall thickness there between, the inner surface forming the interior passageway through the length of the source well casing, the lower end of the source well casing being located within the source well strata aquifer of the site location, the source well casing having an associated source well casing end cap for closing the upper end of the source well casing, the source well casing end cap having a generally centrally located return well casing aperture there through, the end cap being configured to receive and mate with the upper end of the source well casing, the source well casing being fabricated of a rigid material, the source well casing end cap having at least one sensor aperture there through, the source well casing having at least one associated sensor coupled there to, the source well casing having a source well output pipe aperture and an associated source well output pipe being coupled there to;
   a return well casing being located within the interior passageway of the source well casing, the return well casing having a tubular configuration with an interior passageway there through, the return well casing being having a length with a first upper end and a second lower end, the return well casing having a generally round tubular configuration with an inner surface and an outer surface with a wall thickness there between, the inner surface forming the interior passageway through the length of the return well casing, the lower end of the return well casing being located within the return well strata aquifer of the site location, the return well casing having an associated return well end cap for closing the upper end of the return well casing, the return well casing end cap having a generally centrally located return pipe aperture there through and a flange, the flange being configured to receive and mate with the flange of the upper end of the return well casing, the return well casing end cap flange having a plurality of associated coupling bolt holes and bolts, the return well casing being fabricated of a rigid material, the return well end cap having at least one sensor aperture there through, the return well casing end cap having at least one associated sensor coupled there to;
   a return pipe being located within the interior passageway of the return well casing, the return pipe having a tubular configuration with an interior passageway there through, the return pipe being having a length with a first upper end and a second lower end, the return pipe having a generally round tubular configuration with an inner surface and an outer surface with a wall thickness there between, the inner surface forming the interior passageway through the length of the return pipe, the return pipe being located within the interior passageway of the return well casing with the lower end of the return pipe being located within the return well aquifer of the site location, the return pipe having a coupling for joining the return pipe to a water inflow pipe of a water treatment system, the return pipe having at least one associated sensor coupled there to, the return pipe having an associated external plug located at the lower end of the return pipe, the external plug configured to mate with and seal the outer surface of the return pipe and the inner surface of the return well casing, the return pipe being fabricated of a rigid material with the return pipe first upper end having a curved portion;

the water treatment system having a water treatment inflow pipe being coupled to the source well output pipe;

a plurality of filters coupled to the inflow pipe for filtering the output of the booster pump, the filters having an output manifold, the filters having an output;

a water treatment membrane, the membrane having an inflow pipe being operatively coupled to the filter manifold and an outflow pipe, the membrane inflow pipe taking the filter output, the membrane outflow pipe being operatively coupled to a municipal water distribution system; and a bypass pipe operatively coupling the filter manifold and the outflow pipe of the water treatment membrane.

2. The well system as described in claim 1 with the well system further comprising:

a water treatment system pressure booster pump being operatively coupled to the treatment inflow pipe, the booster pump having an associated control, with the booster pump being operatively coupled to the control, the booster pump having an output, the booster pump being located between the source well output pipe and the filters;

a water chlorinator operatively coupled to the bypass pipe and a water chlorinator operatively coupled to the membrane outflow pipe, the water chlorinators each having a sensor and an associated control, the control being operatively coupled to each of the water chlorinators;

a waste water return coupling the water treatment membrane with the return pipe; and the filters having and associated inflow pipe coupled to the booster pump.

3. A well system comprising, in combination:

a site location having a plurality of strata being an underlying deep strata with a deep aquifer, and a source strata with a source aquifer and a surface strata, with the deep strata being deeper than the source strata with the source strata being deeper than the surface strata;

a surface casing having an interior passageway there through, the surface casing being placed in a hole drilled in the ground, the surface casing having a length with a first upper end and a second lower end, the surface casing being located within the surface strata of the site location, the surface casing having an associated surface casing end cap for closing the upper end of the surface casing, the surface casing end cap having an attachment means, the surface casing having at least one sensor operatively coupled thereto;

a source well casing having an interior passageway there through, the source well casing being located within the interior passageway of the surface casing, the source well casing having a length with a first upper end and a second lower end, the source well casing having an inner surface and an outer surface, the inner surface forming the interior passageway through the length of the source well casing, the lower end of the source well casing being located within the source well strata aquifer of the site location, the source well casing having an associated source well casing end cap for closing the upper end of the source well casing, the source well casing end cap having an attachment means, the source well casing having at least one sensor operatively coupled there to;

a return well casing having an interior passageway there through, the return well casing being located within the interior passageway of the source well casing, the return well casing being having a length with a first upper end and a second lower end, the return well casing having inner surface and an outer surface, the inner surface forming the interior passageway through the length of the return well casing, the lower end of the return well casing being located within the return well strata aquifer of the site location, the return well casing having an associated return well end cap for closing the upper end of the return well casing, the return well casing end cap having an attachment means, the return well casing having at least one sensor operatively coupled there to; and a return pipe having an interior passageway there through, the return pipe being located within the interior passageway of the return well casing, the return pipe being having a length with a first upper end and a second lower end, the return pipe having an inner surface and an outer surface, the inner surface forming the interior passageway through the length of the return pipe, the return pipe being located within the interior passageway of the return well casing with the lower end of the return pipe being located within the return well aquifer of the site location, the return pipe having a coupling for joining the return pipe to a water inflow pipe of a water treatment system, the return pipe having at least one associated sensor coupled there to, the return pipe having an associated external plug located at the lower end of the return pipe, the external plug configured to mate with and seal the outer surface of the return pipe and the inner surface of the return well casing, the return being coupled to an inflow pipe of a membrane water treatment system;

the water treatment system having water having a plurality of filters coupled to the inflow pipe for filtering the output of the booster pump, the filters having an output;

the water treatment system membrane having an outflow pipe, the membrane outflow pipe being operatively coupled to a municipal water distribution system; and a bypass pipe operatively coupling the membrane inflow pipe and the outflow pipe of the water treatment membrane.

4. The well system as described in claim 3 with the well system further comprising:

a water treatment system pressure booster pump being operatively coupled to the treatment inflow pipe, the booster pump having an associated control, with the booster pump being operatively coupled to the control, the booster pump being located between and coupling with the source well output pipe and the filters;

a water chlorinator operatively coupled to the municipal water delivery system; and a waste water return coupling the water treatment membrane with the return pipe.

* * * * *